Sept. 27, 1966  D. J. STAMPS  3,275,157
OUTLET DEVICE FOR WASTE PITS, SEPTIC TANKS AND THE LIKE
Filed Sept. 26, 1963

INVENTOR.
DENVER J. STAMPS
BY
Gravely, Lieder & Woodruff
ATTORNEYS

United States Patent Office 3,275,157
Patented Sept. 27, 1966

3,275,157
OUTLET DEVICE FOR WASTE PITS, SEPTIC TANKS AND THE LIKE
Denver J. Stamps, 324 Woods Mill Road, Manchester, Mo.
Filed Sept. 26, 1963, Ser. No. 311,842
5 Claims. (Cl. 210—521)

Briefly, the present invention relates to waste pits, septic tanks and all types of tanks, pits and the like to care for industrial, commercial and residential systems.

Many devices have heretofore been constructed and used for the outlets of septic tanks and the like. All of the known outlet devices allow sludge and other solid and semi-solid materials to escape from the septic tank or the like causing sanitation problems and also causing the outlets to become plugged, and all of the known outlet devices are relatively expensive and complicated to construct and install, and all have required relatively frequent maintenance and repair.

These and other disadvantages of the known devices are overcome by the present device which includes a housing having means to exclude solids from an outlet pipe connected thereto. The outlet means or device permits water and other liquids to escape, but prevent sludge and other solid and semi-solid materials from escaping or reaching the outlet system from the septic tank. The device of this invention includes a housing connected to the usual outlet pipe from the septic tank, and formed with an inlet opening which is effective to separate solids, sludge and the like from the fluids in the septic tank, thereby trapping the solids and sludge within the tank for decomposition by the usual bacterial action, while allowing the fluids to pass out at the outlet pipe. The characteristics of the inlet on the action taking place in the tank are primarily the subject of this invention. In a form of the invention the inlet for the device has sloping sides defining a throat in which a separator block is disposed so that solids and sludge are fended off while fluids are free to enter.

It is therefore a principal object of the present invention to provide improved outlet means for septic tanks, cesspools, and other similar drainage devices.

Another object is to prevent solids and semi-solids from getting into the outlet of a drainage system.

Another object is to provide improved means for draining water away from a storage tank such as a septic tank.

Another object is to reduce maintenance, cleaning and repair costs in septic tanks and like devices.

Another object is to provide an outlet for septic tanks and the like which prevents sludge and other solid and semi-solid materials from draining out during periods when the water level is rising or falling.

Another object is to increase the life of septic tanks, cesspools, and other similar devices.

Another object is to provide relatively inexpensive and easy to install outlet means for septic tanks and the like.

These and other objects and advantages of the present invention will become apparent after considering the following detailed specification covering a preferred embodiment of the invention in conjunction with the accompanying drawing wherein.

Figure 1:
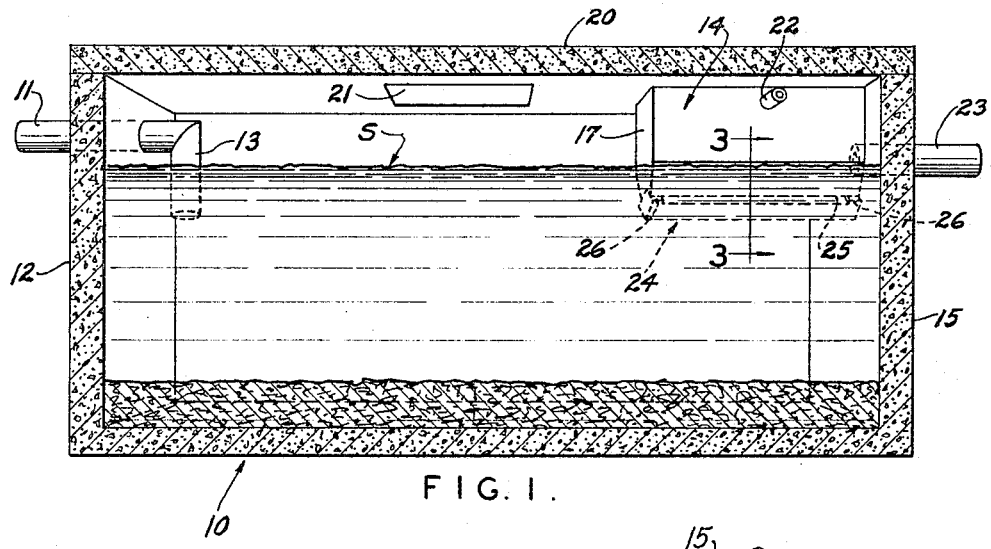
FIG. 1 is a fragmentary cross-sectional view of a septic tank provided with outlet means constructed according to the present invention.

Referring to the drawing by reference numbers, the number 10 refers to a septic tank or similar device. The tank 10 has an inlet pipe 11 on one wall 12 which preferably has a right angle portion 13 that extends downwardly below the level of the contents in the tank 10 for reasons of getting the incoming flow below the scum layer S so that the digestion can proceed.

An outlet device 14 is shown mounted at the opposite wall 15 of the tank so as to be spaced from the inlet 11. The outlet device 14 includes a housing having side walls 16, opposite end walls 17, spaced and angularly related bottom walls 18 which provide an inlet throat to the device 14. The angular relation of the walls 18 results in the formation of a notch 19 in the end walls 17.

Figure 2:
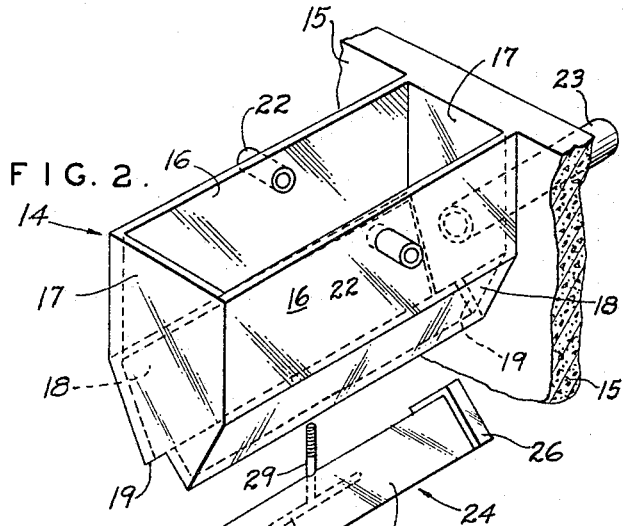
FIG. 2 is a perspective and exploded view of the outlet means per se of FIG. 1.

In the disclosure of FIGS. 1 and 2, the device 14 is shown to be cast integrally with the tank wall 15 and substantially at the top of the tank so that the usual cover 20 for the tank 10 may also cover the device 14. An inspection and clean out opening 21 is formed in the cover 20, and the outlet device 14 is provided with vent openings 22 so that it may breathe.

The outlet device 14 is provided with an overflow pipe 23 in the wall 15 which opens to the interior of the housing at a level lower than the inlet pipe 11 so that there is always a volume in the tank 10 between the inlet and outlet pipes to handle sudden surges in the inlet and prevent backup in the inlet pipe 11. As fluid and solids enter the tank 10 below the scum S the fluid flow is toward the device 14 and extrains the solids in that direction. Such flow is upward from the bottom of the tank 10 toward the throat between the walls 18.

Figure 3:
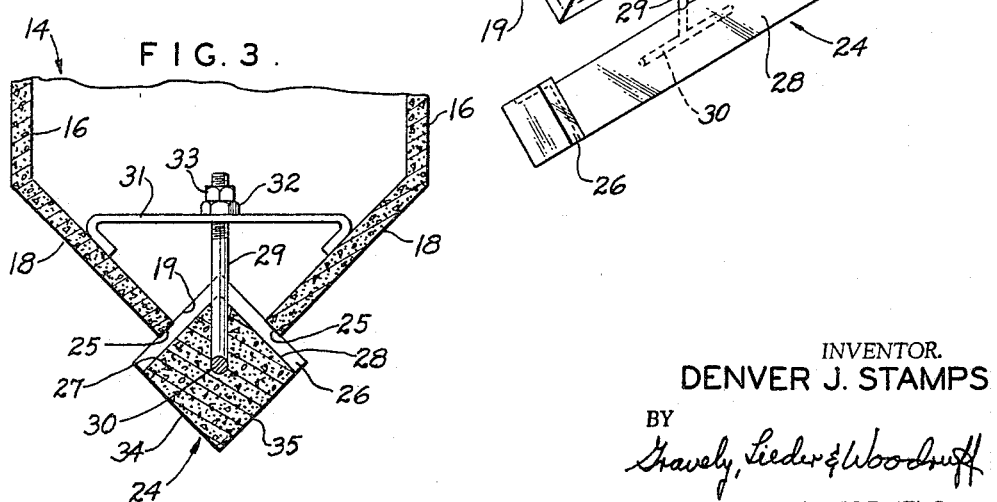
FIG. 3 is a cross-sectional view taken on line 3—3 of FIG. 1.

The outlet device 14 operates to handle the flow of fluid and solids so that the solids are fended off and do not enter the device, while the fluid passes on into the device and out at the pipe 23 until the level in the tank 10 stabilizes and no further flow takes place. The device 14, therefore, includes the separator member 24 which is mounted in the throat and forms inlet slots 25 at the bottom edge of the walls 18. Thus the throat of the device is formed into slots 25 as shown in FIGS. 2 and 3. The member 24 is a block of castable material, substantially square in section and having a length to span the walls 17. The member 24 has end spacers 26 which seat in the notches 19 at each wall 17 and space the member from the walls 18 so that the slots 25 are automatically formed. The spacers 26 extend above the normal surfaces of faces 27 and 28 of members 24, and may be made to any desired dimension so that the width of the slots 25 may be varied as desired. Spaces 26 can be cast integral with the member 24, or each may be separately formed. In making the member 24, a mounting element 29 is embedded therein by its cross-head 30, or other similar enlargement. The device supports a bar 31 and nuts 32 and 33 will hold the element on the bar 31 such that spacers 26 fit into the notches or end wall seats 19 to establish the notches 25. In the form shown only one element 29 is needed, but more elements may be used.

It is observed in FIG. 3 that the flow of fluid and solids upwardly toward the throat of device 14 will first strike the outer angularly diverging surfaces 34 and 35 of member 24. The solids will be forcibly displaced and directed laterally so as to pass well out and away from the slots 25, but if the flow is swift enough to draw the solids inwardly, such solids will strike the slanting walls 18 and again be diverted from the positions directly over the slots 25. Thus primarily fluids reach the slots and non-plugging characteristics for the device 14 are assured.

The slots 25 are generally made with a combined area which is coordinated with the area of inlet pipe 13. This means that the device may be made longer between walls 17 as the pipe 13 increases in diameter, without increasing the width of the slots 25. For small size pipes it may be necessary to have only one slot 25, in which case the member 24 will be modified to have the spacers 26 projecting out only at one surface 27 or 28. It is also possible to vary the thickness of the spacers 26 to vary the slot size. A typical installation might use a four inch inlet pipe 13 which would have an area of about twelve and one-half square inches. The device 14 would then need to have slots 25 of twelve and one-half inch lengths and one-half inch widths to equal the inlet pipe area. If one slot is used, it would have to be one inch wide, but that would be generally considered as too wide for the efficient functioning of the present device. Accordingly, if the slot width is held to one-half inch, the only variable to be figured is the length of the device, that is the spacing between walls 17.

Thus there has been shown and described novel outlet means for septic tanks, cesspools and other drainage devices which fulfills all of the objects and advantages sought therefor. It is recognized, however, that many changes, modifications and alterations, of the particular preferred structure shown and described herein will become apparent to those skilled in the art after considering this detailed specification. All such changes, modifications, and variations which do not depart from the spirit and scope of the invention are deemed to be covered by the invention which is limited only by the claims which follow.

What is claimed is:

1. In outlet means for a septic tank, a housing in said tank having opposed side and end walls and bottom walls, said bottom walls being angularly related and sloping inwardly with their lower edges spaced to form a throat entrance to said housing, an outlet conduit loading from said housing above said entrance throat, and a separator member disposed in said throat in spaced relation from said bottom walls, said separator member having upper angularly converging surfaces extending into said throat entrance and lower angularly diverging surfaces extending outwardly beyond the width of said throat entrance, the angularly diverging surfaces acting to fend off solids and allow fluids to pass through said throat along said upper angularly converging surfaces.

2. In outlet means for a septic tank, a housing in said tank having opposed side and end walls and at least one bottom wall directed angularly relative to said other walls, said bottom wall having a lower edge spaced from said other walls to form an opening into said housing, an outlet conduit leading from said housing above said opening, and a solids diverter member mounted in said opening and having a first surface in spaced relation with said lower edge of said bottom wall and extending into said opening to form a slot, and said member having a second surface spaced from said slot and directed at an angle to said first surface said second surface extending laterally outwardly beyond said lower edge of said bottom wall to divert solids from said opening into said housing.

3. In combination, a waste collecting tank having spaced apart inlet and outlet openings with said outlet below the elevation of said inlet, and an outlet device mounted at said tank outlet opening to pass fluids thereto and retain solids in said tank; said device comprising a walled enclosure having first opposed walls converging downwardly toward edges at an opening at the bottom of said enclosure and second opposed wall each formed with a notch in its bottom margin, said notches and first converging wall edges defining the limits of the bottom opening, and a member mounted at said bottom opening, said member having means thereon to engage said notches and space said member from said edges of the first opposed walls, and said member being formed with angularly upwardly divergent surfaces disposed below and extending laterally outwardly of said converging wall edges into the current of fluid and solids entrained therein to divert the solids from moving into said enclosure at said bottom opening.

4. The combination set forth in claim 3, wherein said first opposed converging walls extend laterally outwardly beyond the reach of said angularly upwardly divergent surfaces, and said edges of said first opposed walls are disposed between said converging walls and divergent surfaces.

5. The combination set forth in claim 3, wherein said member is a solid body extending between said notches in said second opposed walls, said means spacing said member from said first opposed walls being on the opposite ends of said member to engage with said notches.

References Cited by the Examiner
FOREIGN PATENTS 341,333   10/1921   Germany.

REUBEN FRIEDMAN, *Primary Examiner.*

D. M. RIESS, *Assistant Examiner.*

UNITED STATES PATENT OFFICE
CERTIFICATE OF CORRECTION

Patent No. 3,275,157 September 27, 1966

Denver J. Stamps

It is hereby certified that error appears in the above numbered patent requiring correction and that the said Letters Patent should read as corrected below.

Column 3, line 33, for "loading" read -- leading --.

Signed and sealed this 22nd day of August 1967.

(SEAL)
Attest:

ERNEST W. SWIDER
Attesting Officer

EDWARD J. BRENNER
Commissioner of Patents